May 21, 1957  W. COSS  2,792,648
ELECTRICAL DECORATING MODEL
Filed Oct. 16, 1953  2 Sheets-Sheet 1

William Coss
INVENTOR.

BY *[signatures]*
Attorneys

May 21, 1957  W. COSS  2,792,648
ELECTRICAL DECORATING MODEL
Filed Oct. 16, 1953  2 Sheets-Sheet 2
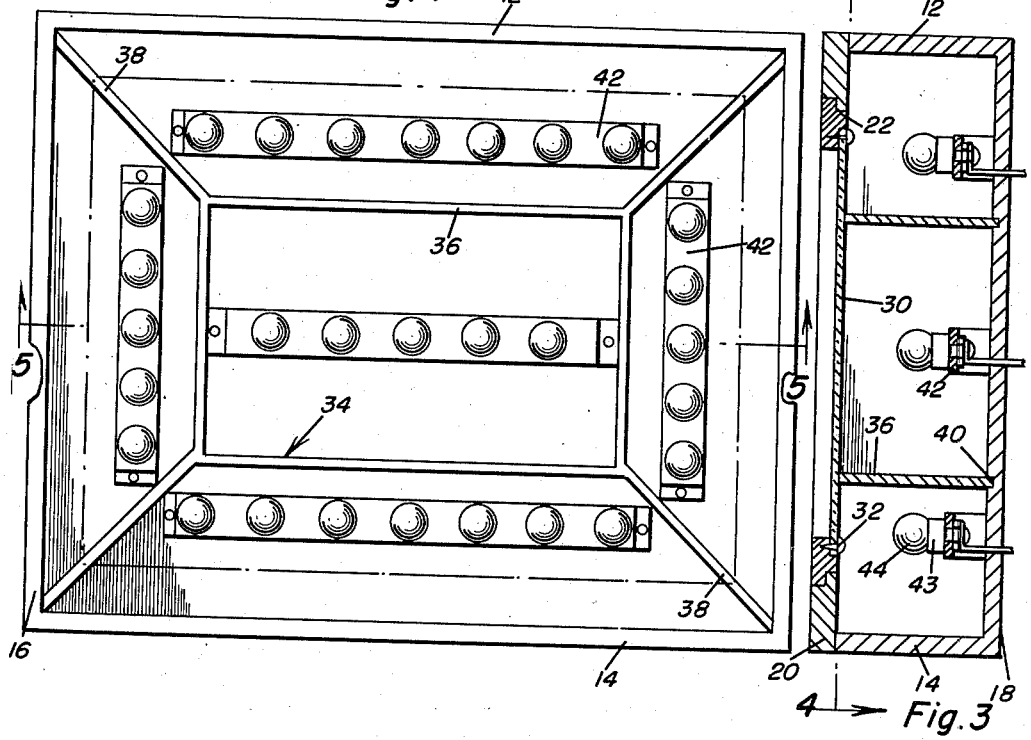
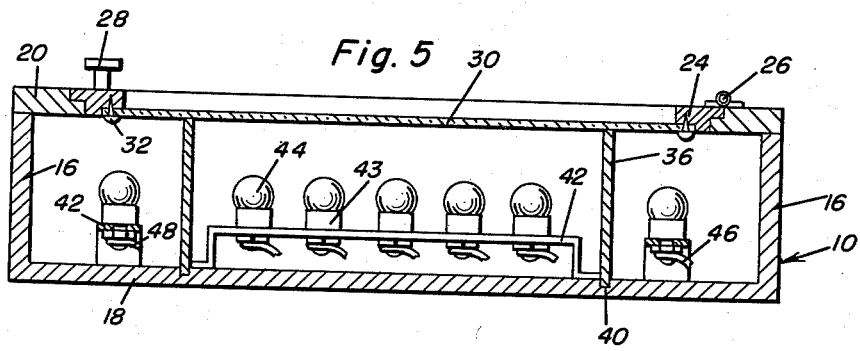
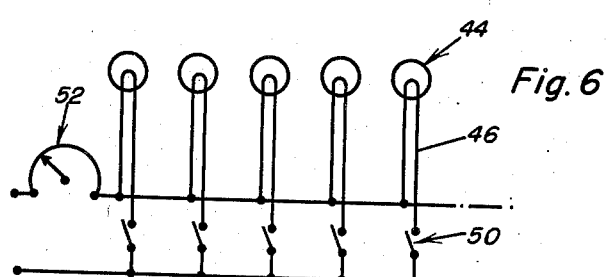
William Coss
INVENTOR.

United States Patent Office 2,792,648
Patented May 21, 1957

2,792,648

ELECTRICAL DECORATING MODEL

William Coss, Little Falls, N. Y.

Application October 16, 1953, Serial No. 386,443

2 Claims. (Cl. 35—53)

This invention relates to an electrical decorating model and more specifically provides a device wherein various decorating schemes of a room may be easily compared by prospective paint customers.

An object of this invention is to provide an electrical decorating model wherein the various surfaces of the interior of a room may be illustrated with the surface having changeable colors wherein various decorating schemes of the interior of a room may be simulated wherein a prospective customer of paint or the like may compare the color combinations.

Another object of this invention is to provide an electrical decorating model having a translucent viewing panel with index lines thereon and a plurality of colored lights located behind each section of the panel formed by the index lines wherein the simulated wall surfaces of the interior of a room may be changed independently.

Yet another object of this invention is to provide an electrical decorating model having a receptacle partitioned off into compartments with the partition thereof having edges corresponding to the index line on the viewing panel wherein the lights behind one section of the viewing panel are orientated from the lights of the other sections.

A still further object of this invention is to provide an electrical decorating model having an individual switch located on the device for independently operating the illuminating means for the various sections of the model and wherein a rheostat is provided on the electrical circuit for varying the intensity of the illuminated areas.

Another important object of this invention is to provide an electrical decorating model which is simple in construction, easy to operate and constructed of readily obtainable materials thereby providing a relative cheapness of manufacture and sale.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse, vertical section taken substantially along section line 3—3 of Figure 1;

Figure 4 is a longitudinal, vertical section taken substantially along section line 4—4 of Figure 3 showing the partition and the relationship of the lights to the partitions;

Figure 5 is a longitudinal, plan section taken substantially along section line 5—5 of Figure 4 showing details of the lighting arrangement and relation of the partition and the viewing panel; and Figure 6 is a diagrammatic view of the electrical circuit for supplying power to the lights.

Figure 1:
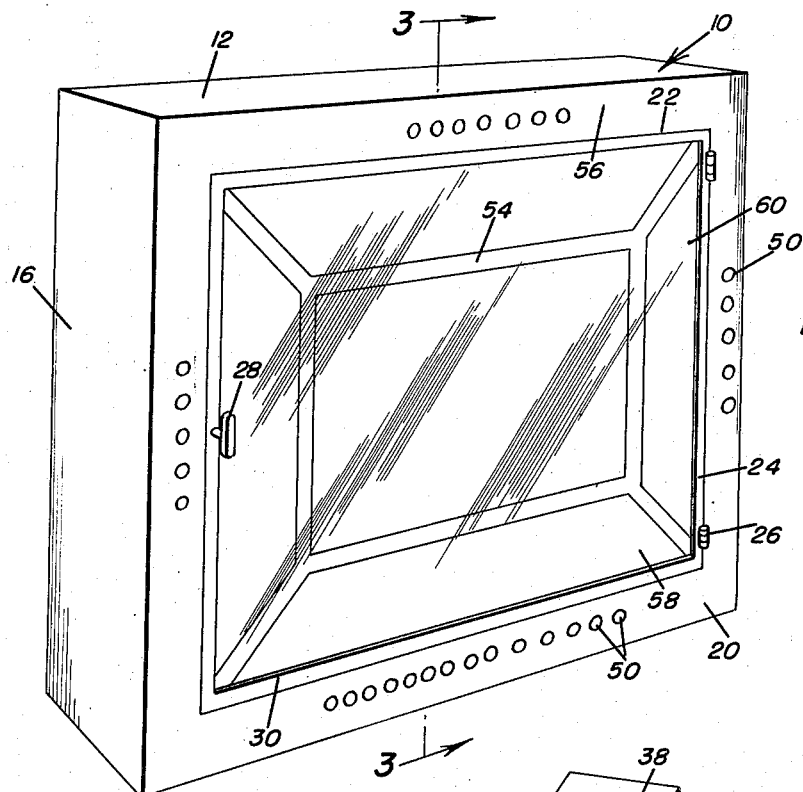
Figure 1 is a perspective view of the electrical decorating model of this invention.

Referring now specifically to the drawings, it will be seen that the numeral 10 generally designates the electrical decorating model of this invention including a receptacle having a top 12, a bottom 14, end wall 16 and side walls 18 and 20 with the side wall 20 having an enlarged opening generally indicated by the numeral 22. The frame member 24 having hinges 26 thereon is secured to one vertical edge of the opening 22 and an operating knob 28 is secured to the other vertical edge of the frame 24 for manipulating the frame 24. A translucent panel 30 is secured to the frame 24 by suitable fastening means 32 and forms a closure for the opening 22.

Figure 2:
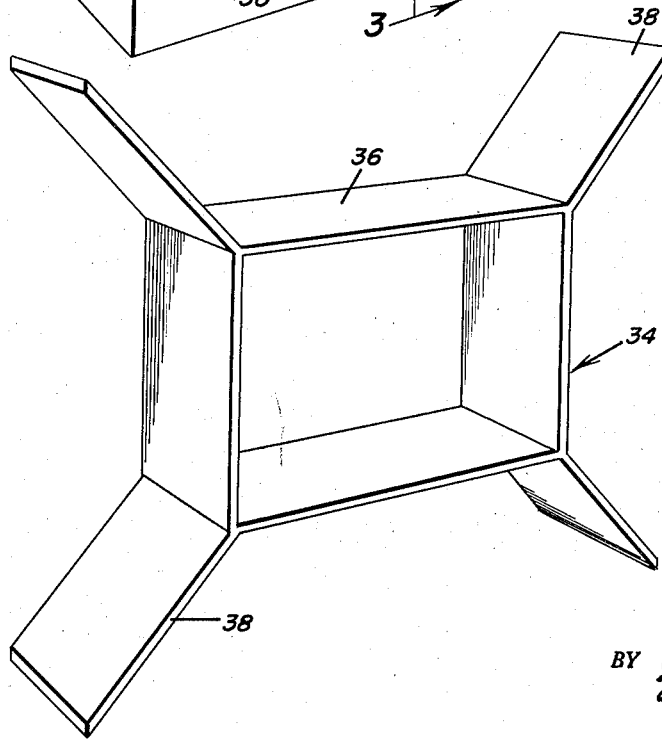
Figure 2 is a perspective view showing the partition located on the interior of the model for separating the model into various compartments.

Referring now specifically to Figures 2 and 4, it will be seen that the interior of the model 10 or cabinet is divided into compartments by a partition generally indicated by the numeral 34 having a rectangular center portion 36 and radially projecting wings 38 at each corner thereof wherein the wings engage the corners at the juncture between the end wall 16, top wall 12 and the bottom 14. It will be seen that the depth of the partition 34 is substantially equal to the depth of the end wall 16 wherein the outer surface or edges of the partition 34 engages the undersurface of the translucent panel 30 when the frame 24 is in closed position. The other side wall 18 includes grooves 40 for receiving the inner edges of the partition 34 thereby securely holding the partition 34 in positive relationship to the cabinet 10.

A U-shaped bracket 42 is secured to the side wall 18 and a plurality of light sockets 43 having suitable colored light bulbs 44 mounted therein is secured to the bracket 42 and a suitable electrical conduit 46 is secured to each light socket 43 for supplying electrical energy thereto for illuminating the colored lights 44. It will be seen that bracket 42, light sockets 43 and light bulbs 44 are secured in each compartment of the cabinet 10 formed by the partition 34.

Referring now to Figure 1, it will be seen that a manual switch 50 of any suitable nature is positioned along the side edges of the side wall 20 adjacent the opening 22 and an individual switch 50 is provided for each light bulb 44.

The lights may be illuminated independently of each other and by suitable manipulation of the switches 50 various color combinations may be simulated on the translucent panel 30. As shown in Figure 6, a rheostat 52 may be positioned in the power line for regulating the intensity of the lights and a rheostat may be employed in conjunction with the switch for regulating the intensity of the various light bulbs 46. As shown in Figure 1, the translucent panel 30 is provided with junctural or index lines generally indicated by the numeral 54 which overlie and correspond to the upper edges of the partition 34 wherein the translucent panel 30 is divided into sections simulating the ceiling 56, floor 58, and three side walls 60 and a plurality of light bulbs 44 is located behind each section 56, 58 and 60 wherein the coloring of each section may be changed by manipulating suitable switches 50. The switches on the bottom portion of the side wall 20 may include an extra set of switches for actuating one of the sections such as the rear side wall in the center of the device as well as the floor 58. Obviously, the interior of the side wall 18 may be coated with any suitable reflective coating for better illumination of the translucent panel 30. The panel 30 may be of any suitable frosted glass or plastic wherein the lights 46 will be sufficiently diffused to provide an even coloring for the sections of the panel 30. The rheostat 52 is provided to vary the intensity of the light rays and such rheostats may be combined with each light bulb to vary the shade of color.

The operation of the device will be readily understood. When it is desirous of demonstrating various color schemes, suitable switches 50 are actuated thereby lighting various colored light bulbs 44 wherein the colored light bulbs produce the desired color combinations for color comparison and analysis. Obviously, the various light bulbs 44 may be changed as desired or as may become necessary by simply pivoting the frame 24 and the translucent panel 30 about hinges 26 in an obvious manner. It will be seen that the partition 34 orientates each section of the receptacle or cabinet 10 from the other compartment thereby forming distinct and sharp junctures or ends between the various sections of the panel.

The electrical decorating model of this invention is especially useful for demonstrating the combinations of color such as paints or the like and may be used in conjunction with another decorating model which show the use of wallpaper or the wall covering surfaces as may be desired. Obviously, the decorating model may be combined with a mechanical unit which is secured to the rear wall 16 and used in conjunction therewith for determining combinations and providing a unitary structure wherein the device may be utilized in a convenient and expeditious manner. The cabinet 10 may be constructed of any suitable material and secured in assembled relation by suitable fastening means and the light sockets may be constructed of any well known material and a suitable spring detent may be provided on the frame 24 maintaining the frame 24 and panel 30 in closed relation to the opening 22.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An electrical decorating model including a cabinet having an enlarged translucent viewing panel, index lines on said panel wherein said panel is divided into sections and simulating the individual wall surfaces of the interior of a room, and means for selectively illuminating said sections with selective colored lights wherein various decorating schemes may be compared, a partition member in said cabinet defining compartments with partition walls corresponding to said index lines, said partition member having a rectangular central frame and a radial projection at each corner thereof.

2. A decorating model comprising a cabinet having an enlarged translucent panel for viewing, a partition member underlying said panel, said partition member including a rectangular central frame, and a radial wall extending from each corner of said frame, said partition member dividing the interior of the cabinet inwardly of the panel into a plurality of compartments, means for illuminating each of the compartments with selective colored lights whereby the areas of the panel overlying the compartments will reveal a colored area to an observer, said colored areas defining an eye level perspective of the interior surface of a floor, ceiling and three walls of a room whereby change in color of the areas permits comparison of different color schemes.

References Cited in the file of this patent

UNITED STATES PATENTS

| | | |
|---|---|---|
| 502,007 | McCormick | July 25, 1893 |
| 1,471,615 | Leffingwell | Oct. 23, 1923 |
| 1,687,106 | Rae | Oct. 9, 1928 |
| 1,719,518 | Nissen | July 2, 1929 |
| 1,751,564 | Stone | Mar. 25, 1930 |
| 2,153,595 | Scantelbury | Apr. 11, 1939 |
| 2,317,336 | Adams | Apr. 20, 1943 |
| 2,336,548 | Kimball | Dec. 14, 1943 |